United States Patent
Sorin et al.

(10) Patent No.: US 10,686,312 B2
(45) Date of Patent: Jun. 16, 2020

(54) MONITORING UNIT FOR MONITORING A CIRCUIT BREAKER COMPRISING AN ELECTRICAL POWER SUPPLY MANAGEMENT SYSTEM AND CIRCUIT BREAKER COMPRISING SUCH A UNIT

(71) Applicant: Schneider Electric Industries SAS, Rueil Malmaison (FR)

(72) Inventors: Joel Sorin, Domene (FR); Bertrand Masseboeuf, Beaucroissant (FR); Yves Geay, Voreppe (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 287 days.

(21) Appl. No.: 15/673,522

(22) Filed: Aug. 10, 2017

(65) Prior Publication Data

US 2018/0062380 A1 Mar. 1, 2018

(30) Foreign Application Priority Data

Aug. 29, 2016 (FR) .................................. 16 58006

(51) Int. Cl.

| | |
|---|---|
| H02H 3/08 | (2006.01) |
| H02H 3/42 | (2006.01) |
| H02H 1/06 | (2006.01) |
| H02H 1/04 | (2006.01) |
| H02H 7/30 | (2006.01) |
| H02H 1/00 | (2006.01) |
| B60L 3/04 | (2006.01) |
| G06F 1/30 | (2006.01) |
| H02H 3/20 | (2006.01) |

(52) U.S. Cl.
CPC ............ *H02H 3/42* (2013.01); *H02H 1/0007* (2013.01); *H02H 1/04* (2013.01); *H02H 1/06* (2013.01); *H02H 7/30* (2013.01); *B60L 3/04* (2013.01); *G06F 1/305* (2013.01); *H02H 3/08* (2013.01); *H02H 3/20* (2013.01)

(58) Field of Classification Search
USPC ........................... 361/62–69, 86–87; 307/64
See application file for complete search history.

(56) References Cited

U.S. PATENT DOCUMENTS

| | | | |
|---|---|---|---|
| 2005/0034003 A1* | 2/2005 | Sato .................... | G06F 11/2015 713/340 |
| 2009/0190279 A1* | 7/2009 | Rusan ..................... | H02H 7/26 361/93.6 |
| 2010/0321837 A1 | 12/2010 | Caiti et al. | |
| 2012/0126625 A1 | 5/2012 | Maher et al. | |

* cited by examiner

*Primary Examiner* — Danny Nguyen
(74) *Attorney, Agent, or Firm* — Oblon, McClelland, Maier & Neustadt, L.L.P.

(57) ABSTRACT

A monitoring unit for monitoring a circuit breaker includes a safety module; programmable computation modules; an electrical power supply management system to switch, according to the level of electrical power received from electrical power supply sources and according to a predefined power supply program, between an active power supply mode in which the safety module and at least a portion of the computation modules are supplied with power, and a safety power supply mode in which the safety module is supplied with power and the computation modules are not supplied with power.

9 Claims, 3 Drawing Sheets

MONITORING UNIT FOR MONITORING A CIRCUIT BREAKER COMPRISING AN ELECTRICAL POWER SUPPLY MANAGEMENT SYSTEM AND CIRCUIT BREAKER COMPRISING SUCH A UNIT

BACKGROUND

1. Field

The invention relates to a monitoring unit for monitoring a circuit breaker, comprising an electrical power supply management system.

2. Background

In the field of electrical protection, there is a known way of using monitoring units for controlling the tripping of electrical circuit breakers. Such a monitoring unit is typically provided with microcontrollers and microprocessors intended to perform functions of managing the circuit breaker with which the monitoring unit is associated, for example with the aim of measuring electrical quantities relating to the operation of the circuit breaker and communicating these measurements to a dedicated collection point outside the unit.

This monitoring unit is provided with an electrical power supply management system which, during its operation, is connected to electrical power supply sources of different kinds. These power supply sources deliver an incoming electrical power which is used to supply electricity to the microcontrollers and microprocessors for the purpose of their operation.

Known monitoring units have a drawback in that they do not provide satisfactory management of the electrical power supply from a plurality of electrical power supply sources whose power supply level may vary over time, for example when one or more power supply sources are interrupted or withdrawn. In particular, there is a risk that, if one or more electrical power supply sources are lost, or if there is an internal fault indicating excess consumption, the monitoring unit is no longer supplied with sufficient energy to provide the protective functions of the circuit breaker. The monitoring unit then ceases to be capable of switching the circuit breaker if an abnormal situation occurs, contrary to safety requirements. Furthermore, the power supply management systems of known units cannot provide satisfactory control of power consumption during the operation of the monitoring unit.

It is these drawbacks that the invention is intended more particularly to overcome, by proposing a monitoring unit for monitoring an electrical circuit breaker, which comprises an electrical power supply management system capable of managing distinct electrical power supply sources, while ensuring that safety functions of the monitoring unit are maintained if there is a change in the level of electrical power supplied by the electrical power supply sources.

SUMMARY

The invention therefore proposes a monitoring unit for monitoring a circuit breaker, said monitoring unit being intended to be associated with an electrical circuit breaker and to be connected electrically to input terminals of this circuit breaker, and having:

a safety module, containing an integrated circuit configured to send a command for switching the circuit breaker if this safety module detects an operating anomaly, a plurality of programmable computation modules, intended to provide functions for the management of the circuit breaker when the unit is associated with the circuit breaker, an electrical power supply management system, comprising a connection interface intended to be connected to distinct electrical power supply sources, for receiving incoming electrical power delivered by these power supply sources, this interface being electrically connected to the safety module and to the computation modules for the selective redistribution of the received electrical power towards the safety module and the computation modules, the power supply management system being configured to switch automatically, according to the level of electrical power received from the electrical power supply sources and according to a predefined power supply program, between:

at least one active power supply mode, in which the safety module and at least a portion of the computation modules are supplied with the incoming electrical power, and a safety power supply mode, in which the safety module is supplied with the incoming electrical power from the power supply sources, and said computation modules are isolated from the connection interface and are not supplied with the incoming electrical power.

As a result of the invention, when the electrical power supply sources cease to be capable of providing the power supply to the monitoring unit, the power supply management system prioritizes the supply to the safety module, ahead of the other modules. Thus the reliability and safety of the monitoring unit is assured.

According to advantageous but non-essential aspects of the invention, such a unit may incorporate one or more of the following characteristics, considered singly or in any technically acceptable combination:

The electrical power supply management system is configured to switch to the safety power supply mode when the electrical power received on the connection interface falls below a predefined minimum threshold, this minimum threshold being determined according to the electrical power consumed by the computation modules.

The power supply management device comprises:

an external power supply rail which is intended to be electrically connected to a first power supply source from among the electrical power supply sources, this rail being connected to the computation modules so as to supply the computation modules with electricity, an internal power supply rail which is adapted to be electrically connected to a second power supply source from among the electrical power supply sources, this rail being electrically connected to the safety module so as to supply this safety module with electricity, a controllable switch, adapted for the selective connection or isolation of the internal power supply rail to or from the external power supply rail, according to the level of electrical power received by the internal and external power supply rails.

The power supply management system further comprises:

an electrical energy storage unit, a common power supply rail, electrically connected to the storage unit, the power supply management system being configured to electrically connect the common power supply rail and the storage unit to the computation modules when the electrical power supplied by the other electrical power supply sources falls below a predefined threshold, so as to keep the computation modules temporarily supplied by the storage unit.

The monitoring unit further comprises a reset button, configured to generate a reset signal to be sent to at least one of the computation modules when it is activated, the power supply management system also being configured to automatically disconnect the common power supply rail from the internal power supply rail and to discharge the storage unit when the reset button is activated.

The power supply management system comprises:
  voltage detection units, each intended to be associated with an electrical power supply source and being configured to send an activation signal if this measurement unit detects that the corresponding power supply source is generating a voltage greater than or equal to a predetermined voltage, and
  logic gates arranged to initiate switching between the safety power supply mode and at least one active power supply mode according to the signals sent by the detection units.

The electrical power supply management system is further configured to switch automatically from the safety power supply mode to an active power supply mode when the electrical power received on the connection interface rises above the predefined minimum threshold.

Each of the computation modules comprises a programmable microprocessor or microcontroller.

According to another aspect, the invention relates to an electrical circuit breaker, comprising an associated monitoring unit, the monitoring unit being according to the invention and the circuit breaker comprising at least a second electrical power supply source, connected to the connection interface and being connected to input terminals of the circuit breaker so as to be supplied with electricity by the current flowing in the circuit breaker during the operation of the circuit breaker.

BRIEF DESCRIPTION OF THE DRAWINGS

The invention will be more readily understood and other advantages of the invention will be more clearly apparent in the light of the following description of an embodiment of a monitoring unit, provided solely by way of example, with reference to the attached drawings, in which.

DETAILED DESCRIPTION

Figure 1:
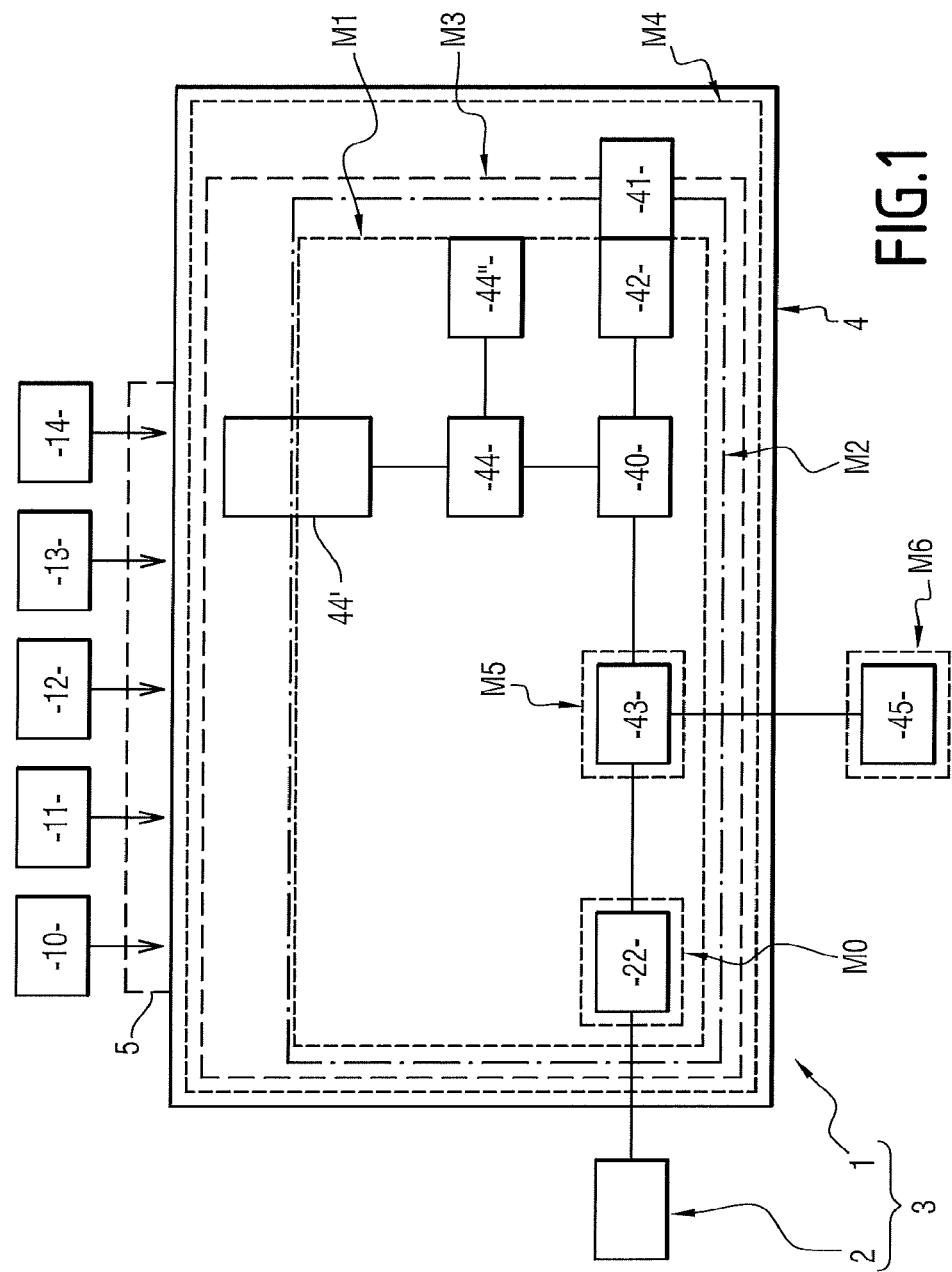
FIG. 1 is a simplified synoptic diagram of a monitoring unit of a circuit breaker according to the invention.

FIG. 1 shows a monitoring unit 1 for an electrical circuit breaker 2. In this case, the unit 1 is associated with the circuit breaker 2, to form an electrical assembly 3. More precisely, in this case, the circuit breaker 2 comprises the monitoring unit 1.

In a known way, the circuit breaker 2 comprises power input and output terminals which are selectively connected or isolated electrically to or from one another by separable moving contacts of the circuit breaker 2.

For example, these power input and output terminals are intended to be electrically connected to an electrical circuit, or electricity network, so that the latter is protected by the circuit breaker 2.

The unit 1 is intended to selectively control the opening of the circuit breaker 2, that is to say the separation of the input and output terminals in case of the detection of an operating anomaly such as excess current or a short circuit, in order to prevent the flow of the electric current between these terminals.

For example, the monitoring unit 1 is also configured to measure physical quantities representative of the current flowing in the circuit breaker 2.

For this purpose, the unit 1 comprises a safety module 22 configured to send a command for switching the circuit breaker 2 if this safety module detects an operating anomaly, for example within the electricity network protected by the circuit breaker 2, such as excess current or a short circuit.

In this example, the safety module 22 comprises an electronic circuit of the ASIC type (for "Application Specific Integrated Circuit" in English).

The monitoring unit 1 further comprises a plurality of programmable computation modules, intended to provide functions for the management of the circuit breaker 2. For example, these computation modules comprise a programmable microprocessor or microcontroller. In this case, the computation modules provide what are known as application functions, distinct from the safety functions provided by the safety module 22.

In this example, the monitoring unit 1 comprises the following computation modules:
  a measurement module 40, called a "monitoring and protection" module in English, configured for measuring electrical quantities relating to the electric currents and voltages present in the circuit breaker 2 during its operation, for example in order to calculate statistics about use;
  application modules 41 and 42, adapted to manage high-level application functions, for example by supervising data exchanges with an external communication bus;
  a diagnostic module 43, called a "trip cause indicator" in English, adapted to determine a cause of tripping of the circuit breaker 2;
  a communication module 44, called a "display and wireless" module in English, equipped with a communication interface comprising a display screen 44' and one or more radio frequency communication interfaces 44". The display screen 44' comprises backlighting means which can operate in a low-brightness mode or a high-brightness mode.

These computation modules 40, 41, 42, 43 and 44 require an electrical power supply for their operation.

Optionally, the unit 1 further comprises a wireless communication module 45 of the contactless type, for example one using NFC (for "Near Field Communication") technology, adapted for transmitting information contained in the diagnostic module 43 to a complementary data reader outside the unit 1.

The monitoring unit 1 further comprises an electrical power supply management system 4 which is equipped with a connection interface 5 intended to be selectively connected to electrical power supply sources 10, 11, 12, and 13 in order to receive incoming electrical power delivered by these power supply sources.

For this purpose, the interface 5 is electrically connected to the security module 22 and to the computation modules 40, 41, 42, 43, 44 and 45 in order to redistribute the received electrical power to them selectively.

The power supply sources may be disconnected from the interface 5, or may cease to operate during the operation of the unit 1, either in a predicted way or otherwise. Power supply sources may also be added to the interface 5, or may start up during the operation of the unit 1. The sources 10, 11, 12 and 13 are shown here as being connected to the connection interface 5, but in practice it is possible that only one or more of these sources is connected and supplies electrical power at a given instant.

In this example, the source 10 is an auxiliary power supply source adapted to deliver a DC voltage of 24 volts. This source is, for example, supplied from an inverter or secure power supply external to the electrical assembly 1.

The source 11 here represents an electrical power supply provided by external computer equipment connected to the unit 1 by means of a USB (for "Universal Serial Bus" in English) communication port. The source 11 is adapted to deliver a DC voltage of 5 volts.

The source 12 is here at least one current transformer placed around a power conductor of the circuit breaker 2 to deliver a voltage when an electric current flows in the circuit breaker 2. Thus the source 12 may cease to operate when the circuit breaker 2 is in an open state.

The source 13 here comprises a voltage transformer, connected to the terminals of the circuit breaker 2 to deliver a voltage as long as a voltage is present on the terminals. For example, the source 13 is partially integrated into the unit 1 and may be withdrawn from it and then cease to operate.

Finally, the unit 1 is here adapted to be connected to an additional energy source 14 such as a battery, for example a rechargeable battery. This source 14 may be omitted.

The sources 10 and 11 belong here to a first group of power supply sources, called sources external to the circuit breaker 2.

The sources 12 and 13 belong here to a second group of power supply sources, distinct from the first group, called the group of sources internal to the circuit breaker 2.

The sources 12 and 13 are here again present within the circuit breaker 2, although they may entirely or partially cease to supply electrical power to the unit 1 during the operation of the circuit breaker 2.

On the other hand, the sources 10 and 11 may be disconnected from the unit 1 during its operation.

The management system 4 is configured to switch automatically among a plurality of distinct power supply modes, according to the level of electrical power received from the power supply sources 10, 11, 12 and 13 and the battery 14, and according to a predefined power supply program. This switching enables the consumption of the unit 1 to be adapted according to the incoming electrical power.

Notably, the management system 4 is configured to switch selectively between a safety power supply mode M0 and at least one active power supply mode, the active modes numbering four in this case and being denoted M1, M2, M3 and M4.

In the safety power supply mode M0, the safety module 22 is supplied with the incoming electrical power from the power supply source or sources that are active, that is to say those that supply electrical power on the connection interface 5. Said computation modules 40, 41, 42, 44 are isolated from the connection interface 5 and are not supplied with the incoming electrical power.

In each of the active power supply modes M1, M2, M3 and M4, the safety module 22 and at least a portion of the computation modules 40, 41, 42, 43, 44 are electrically supplied with the incoming electrical power.

The power supply management system 4 is notably configured to switch to the safety power supply mode M0 when the electrical power received on the connection interface 5 falls below a predefined minimum threshold, this minimum threshold being determined according to the electrical power consumed by the computation modules 40, 41, 42, 44 and by the display screen 44' and the radio frequency communication interface or interfaces 44".

The power supply management system 4 is further configured to switch automatically from the safety power supply mode M0 to one of the active power supply modes M1, M2, M3, M4 when the electrical power received on the connection interface 5 rises above the predefined minimum threshold.

Thus, the safety functions of the circuit breaker 2 are provided by the monitoring unit 1 if there is a change in the level of electrical power supplied by the electrical power supply sources 10, 11, 12 and 13.

More generally, the power supply management system 4 is configured to switch from an active power supply mode M1, M2, M3, M4 to another active power supply mode M1, M2, M3, M4 if the value of electrical power received goes beyond predetermined transition values.

By way of illustration, the power supply mode M0 corresponds here to the case in which only the source 12 is active and supplies a first level of electrical power. For example, the source 12 supplies an incoming electrical power of 0.42 W with a current of 20 mA. In this mode, the module 22 is supplied with power. The computation modules are not supplied with electricity from the interface 5.

The mode M1 corresponds here to the case in which only the source 12 is active and supplies a second level of incoming electrical power, higher than the first level of power. For example, the source 12 supplies an incoming power of 2.2 W with a current of 105 mA. In this mode M1, the module 22 and the computation modules 40, 42 and 43 are all activated, and the module 44 is partially activated, for example with the backlighting means of the display screen 44' operating in low-brightness mode.

The mode M2 corresponds here to the case in which the source 13 is active. For example, the incoming electrical power is equal to 2.6 W. The activated modules are the same as those in the power supply mode M1. Only the nature of the power supply source has changed.

The mode M3 corresponds here to the case in which the source 11 is active. By contrast with the power supply mode M2, the computation module 44 is fully supplied with electricity, for example in order to enable the backlighting means of the display screen 44' to operate in maximum brightness mode.

Finally, the mode M4 corresponds here to the case in which the source 10 is active. By contrast with the power supply mode M3, the computation module 41 is here fully supplied with electricity, for example in order to allow additional functions to be performed.

The system 4 also comprises here, by way of illustration, additional power supply modes M5 and M6. These modes M5 and M6 are not managed here by the power supply management system 4, and may be omitted.

M5 denotes a power supply mode corresponding the supply of power to the diagnostic module 43 by the battery 14. This provides a back-up mode for its power supply, independent of the power supply mode M0.

M6 denotes a mode in which the incoming power is zero; that is to say, the unit 1 is not in operation. This mode M6 corresponds to the operation of the wireless communication module 45, this module being capable of operating solely by means of electrical power supplied by a radio frequency data reader.

The active power supply modes M1, M2, M3 and M4 are preferably defined in advance or in an ongoing manner, on the basis of the knowledge of the levels of electrical power that can be supplied by each of the power supply sources and the electrical power consumption of each of the computation modules. In other words, each power supply mode M1, M2, M3 and M4 is associated with a specific combination of power supply sources from among the power supply sources 10, 11, 12 and 13 supplying a given electrical power. For each power supply mode M1, M2, M3 and M4, only the computation modules that can be supplied with this electrical power are intended to be put into operation in this power supply mode.

Thus, the number and nature of the power supply modes depend on the computation modules and power supply sources that are to be received on the interface 5, and may therefore be different.

This arrangement provides satisfactory control of electricity consumption during the operation of the monitoring unit 1.

Figure 2:
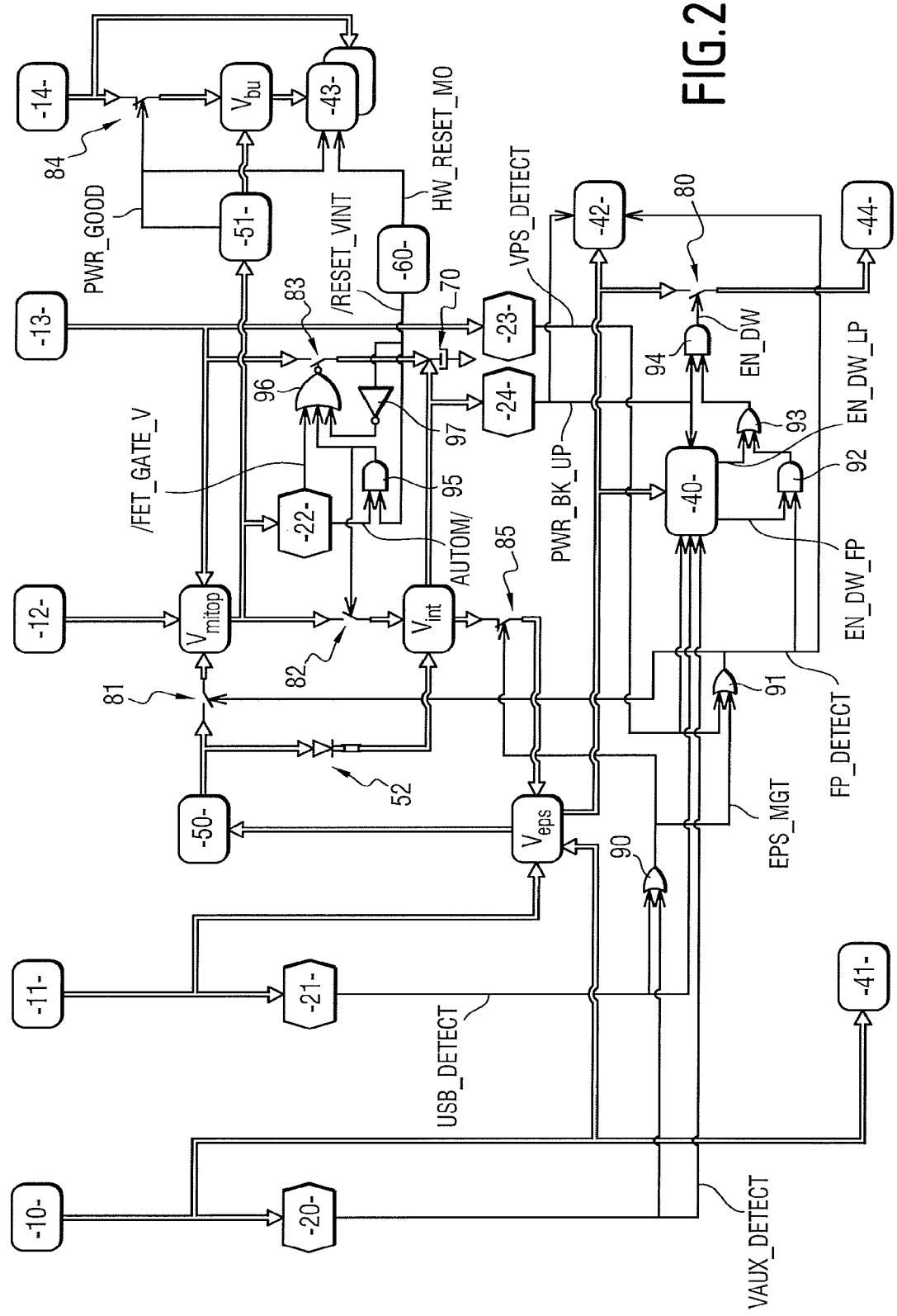
FIG. 2 is a simplified diagram of an electrical power supply management system of the monitoring unit of FIG. 1.

As shown in FIG. 2, the power supply management system 4 here comprises an external power supply rail Veps and an internal power supply rail Vmitop.

In FIG. 2, the various elements of the management system 4 are shown in a simplified manner in the form of blocks interconnected by lines. The thick lines represent electrical power supply connections, while the thin lines represent data links. For example, a data link is an electrical signal that may have two values, each associated with a logic state. Here, a DC voltage of 3.3 volts corresponds to an active state, while a zero voltage corresponds to an inactive state.

The external power supply rail Veps is intended to be electrically connected to the power supply sources 10 and/or 11, and is electrically connected to the computation modules 40, 42 and 44 so as to supply them with electricity when the sources 10 and/or 11 are active. These computation modules are either connected directly to the rail Veps, or connected via a controllable switch.

Here, the module 41 is directly connected to the interface 5 so that it is supplied directly by the source 10 without passing through the rail Veps. Thus this module 41 can be supplied with electricity only if the source 10 is present.

The way in which the power supply modules are connected, either directly to the source 10 and/or 11 or via the power supply rail Veps, depends on the way in which the active power supply modes M1, M2, M3 and M4 are defined.

The internal power supply rail Vmitop is adapted to be electrically connected to the power supply sources 12 and 13, and is electrically connected to the safety module 22 so as to supply this safety module 22 with electricity.

The power supply rails Vmitop and Veps here form part of the connection interface 5.

The system 4 here comprises a power converter 50 and a controllable switch 81 for connecting the power supply rail Veps to the power supply rail Vmitop.

The controllable switch 81 is adapted for the selective connection or isolation of the internal power supply rail Vmitop to or from the external power supply rail Veps, according to the level of electrical power received by the internal and external power supply rails.

For example, the switch 81 is a MOSFET power transistor.

Here, the switch 81 is in a blocking state by default, and switches to a conducting state only when it receives a signal FP_DETECT on a control electrode.

In this example, since the source 12 is more reliable because of its position within the circuit breaker 2 and because of the fact that it continues to be supplied while the circuit breaker 2 remains in operation in the closed state, it is this source that is prioritized for supplying the module 22 when the other sources 10, 11 and/or 13 cease to operate.

Thus the transition to the mode M0 is, notably, executed by disconnecting the power supply rail Veps from the power supply rail Vmitop when the sources 10 and 11 cease to operate, so that the electrical power supplied by the source 12 does not supply the computation modules, in this case 40, 41, 42 and 44.

The management system 4 here comprises detection units associated with electrical power supply sources of the connection interface 5. Each detection unit is adapted to detect that the electrical source with which it is associated is active. For example, each detection unit measures the voltage supplied by the source with which it is associated, and sends a detection signal when this voltage is greater than a predetermined value of voltage, for example the nominal voltage value of this voltage source.

The numbers 20, 21 and 23 denote measurement units associated with the sources 10, 11 and 13 respectively. Additionally, the symbols VAUX_DETECT, USB_DETECT and VPS_DETECT denote the respective signals of the measurement units 20, 21 and 23.

The system 4 also comprises logic gates arranged to initiate switching between the safety power supply mode M0 and the power supply modes M1, M2, M3 and M4, according to the signals sent by the detection units, notably by controlling the switch 81.

The use of logic gates to switch between electrical power supply modes provides faster operation of the management system 4 than would the use of a dedicated microprocessor.

In this example, the system 4 comprises:
- an OR logic gate 90 which receives the signals VAUX_DETECT and USB_DETECT at its input and supplies a signal EPS_MGT at its output;
- an OR logic gate 91 which receives the signals EPS_MGT and VPS_DETECT to form at its output the signal FP_DETECT which controls the switch 81.

As long as the sources 10 and 11 are active, the signal FP_DETECT is sent, keeping the switch 81 in the conducting state. As soon as one of the sources 10 and/or 11 is cut off, the signal FP_DETECT ceases to be sent, and the switch changes to the blocking state.

Advantageously, the power supply management system 4 further comprises an electrical energy storage unit 70, such as a capacitor, and a common power supply rail Vint, electrically connected to the storage unit 70.

The power supply management system 4 is configured to electrically connect the common power supply rail Vint and the storage unit 70 to the computation modules when the electrical power supplied by the second electrical power supply sources falls below a predefined threshold, so as to keep the computation modules temporarily supplied by the storage unit 70.

Thus, when the incoming power becomes insufficient to keep these computation modules in operation, they can be supplied with enough energy to give them time to record the data being processed and to shut down normally.

Here, the storage unit 70 is connected between an electrical earth of the management system 4 and the power supply rail Vint.

A controllable switch 85 is adapted for the selective connection or isolation of the common power supply rail Vint to or from the external power supply rail Veps, according to the level of electrical power received by the internal and external power supply rails. Here, the switch 85 is in a conducting state by default, and switches to a blocking state only when it receives the signal EPS_MGT on a control electrode.

The power supply rail Vint is also electrically connected to the power converter 50 via a power link comprising a protection unit 52 equipped with a diode, in such a way that the storage unit 70 is recharged when the system 4 is in a state of being supplied with sufficiently high incoming power.

The system 4 is also equipped with a detection unit 24, similar to the detection units 20, 21 or 23, here associated with the common power supply rail Vint and adapted to supply a signal PWR_BK_UP when the power supply rail Vint is supplied with power. This signal PWR_BK_UP can be used to switch off the computation modules before the energy reserve stored in the storage unit 70 is exhausted.

In this example, the modules 40 and 42 are directly connected to the power supply rail Veps. The unit 44 is connected to the rail Veps via a controllable switch 80 which is similar to the switch 81, and which is controlled by a signal EN_DW.

The signals VAUX_DETECT, USB_DETECT and VPS_DETECT are supplied on data inputs of the module 40. In response, when it is supplied with power, the latter module calculates signals EN_DW_FP and EN_DW_LP which are indicative of the state of being supplied with power.

The signal EN_DW is thus calculated by means of:
- an AND logic gate 92 which receives the signals FP_DETECT and EN_DW_LP at its input,
- an OR logic gate 93 which receives at its input the signal EN_DW_LP and the output of the logic gate 92,
- an AND logic gate 94 which receives at its input a signal PWR_BK_UP and the output of the logic gate 93, and which supplies the signal EN_DW at its output.

Advantageously, the monitoring unit 1 further comprises a reset button 60, configured to generate, when it is activated, a reset signal HW_RESET_M0 to be sent to at least one of the computation modules, in this case the computation module 43. Additionally, the power supply source 10 must be disconnected or neutralized in advance to make the reset effective. Finally, there is no need to disconnect or neutralize the sources 10, 11, 12, 13 and 14 to make the reset by activation of the reset button 60 effective.

The power supply management system 4 is also configured to automatically disconnect the common power supply rail Vint from the internal power supply rail Vmitop and to discharge the storage unit 70 when the reset button 60 is activated.

For this purpose, the system 4 here comprises a controllable switch 82, selectively connecting the power supply rails Vint and Vmitop, together with a controllable switch 83 directly connecting the storage unit 70 to the power supply rail Vmitop. The switches 82 and 83 are similar to the switch 81 and are in the blocking state by default.

The management system 4 further comprises an AND logic gate 95, which receives at its input a signal /RESET_VINT generated by the button 60 when it is activated and a signal AUTOMI generated by the module 22, a NOT logic gate 97 which receives at its input the signal /RESET_VINT, and a three-input NOR logic gate 96 which receives at its input a signal /FET_GATE_V generated by the module 22, the signal supplied from the output of the logic gate 97, and the signal supplied from the output of the logic gate 95. The switch 82 is controlled by the output signal of the logic gate 95 when the switch 83 is controlled by the output signal of the logic gate 96. Thus, when the reset button 60 is activated, the switches 82 and 83 are blocked. The modules 40, 42 and 44 are then no longer supplied with power, and reset themselves. In this example, the operation of the module 43 is independently ensured by the source 14. Here, the source 14 is not intended to supply the safety module 22, regardless of the power supply mode.

Thus the system 4 comprises an additional power supply rail Vbu connected to a power supply input of the module 43. The system 4 also comprises a power converter 51 adapted to supply the power supply rail Vbu from the internal power supply rail Vmitop. The source 14 is connected to the power supply rail Vbat by a controllable switch 84 controlled by the power converter 51. More precisely, the switch 84 isolates the power supply bus Vbu from the source 14 as long as the power supply is provided by the internal power supply rail Vmitop, here by means of a signal PWR_GOOD, and switches to a conducting state when the power supply rail Vbat ceases to be supplied by the power supply rail Vmitop.

Figure 3:
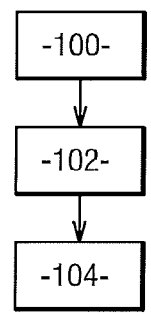
FIG. 3 is a flow diagram of a method of operation of the power supply management system of FIG. 2.

FIG. 3 shows an example of the operation of the management system 4.

Initially, in a step 100, the unit 1 is in a normal operating state, associated with the circuit breaker 2, and is in a first electrical power supply mode. For example, the electrical power supply sources 10, 11, 12 and 13 are connected to the connection interface 5 and deliver a non-zero incoming electrical power on this connection interface 5, so that the unit 1 is in the power supply mode M4.

Finally, in a step 102, the value of incoming electrical power decrease, for example because one of the electrical power supply sources 10, 11, 12 and 13 ceases to operation and/or is withdrawn. In this example, the electrical power supply sources 10, 11 and 13 cease to operate. The incoming electrical power falls below the predefined minimum threshold.

Then, in a step 104, the management system 4 automatically causes switching to the power supply level M0. Here, as soon as the power supplies 10, 11 and 13 cease to operate, the detection units 20, 21 and 23 interrupt the transmission of the signals VAUX_DETECT, USB_DETECT and VPS_DETECT respectively.

Consequently, the signal FP_DETECT is interrupted and the switch 81 changes to the blocking state, interrupting the electrical power supply to the power supply rail Veps and isolating the connection interface 5 to which the source 12 is still connected. The unit 1 is then in the power supply state M0.

In this way, the safety module 22 continues to be supplied with electricity by the source 12, while the modules 40, 41, 42 and 44 are no longer supplied with electricity by this source 12. Thus the interruption of the operation of the safety module 22 is avoided.

The embodiments and variants described above may be combined with one another to generate new embodiments.

The invention claimed is:

1. A monitoring unit for monitoring a circuit breaker, the monitoring unit to be associated with the circuit breaker and to be connected electrically to input terminals of the circuit breaker, the monitoring unit comprising:
   a safety module including an integrated circuit configured to send a command for switching the circuit breaker when the safety module detects an operating anomaly;
   a plurality of programmable computation modules to provide functions for management of the circuit breaker when the monitoring unit is associated with the circuit breaker; and
   an electrical power supply management system comprising a connection interface to be connected to distinct electrical power supply sources, for receiving incoming electrical power delivered by the electrical power supply sources, the connection interface being electrically connected to the safety module and to the programmable computation modules for selective redistribution of the received electrical power towards the safety module and the programmable computation modules,
   wherein the electrical power supply management system is configured to switch automatically, based on whether the electrical power received on the connection interface falls below or rises above a predefined minimum threshold and according to a predefined power supply program, between:
      at least one active power supply mode, in which the safety module and at least a portion of the programmable computation modules are electrically supplied with the incoming electrical power, and
      a safety power supply mode, in which the safety module is supplied with the incoming electrical power from the electrical power supply sources, and the programmable computation modules are isolated from the connection interface and are not supplied with the incoming electrical power.

2. The monitoring unit according to claim 1, wherein the electrical power supply management system is configured to switch to the safety power supply mode when the electrical power received on the connection interface falls below the predefined minimum threshold, the predefined minimum threshold being determined according to electrical power consumed by the programmable computation modules.

3. The monitoring unit according to claim 1, wherein the electrical power supply management system comprises:
   an external power supply rail to be electrically connected to a first power supply source from among the electrical power supply sources, the external power supply rail being connected to the programmable computation modules so as to supply the programmable computation modules with electricity,
   an internal power supply rail, to be electrically connected to a second power supply source from among the electrical power supply sources, the internal power supply rail being electrically connected to the safety module so as to supply the safety module with electricity, and
   a controllable switch for selective connection or isolation of the internal power supply rail to or from the external power supply rail, according to a level of electrical power received by the internal and external power supply rails.

4. The monitoring unit according to claim 1, wherein the electrical power supply management system comprises:
   an electrical energy storage unit, and
   a common power supply rail electrically connected to the electrical energy storage unit,
   the electrical power supply management system being configured to electrically connect the common power supply rail and the electrical energy storage unit to the programmable computation modules when the electrical power supplied by second electrical power supply sources falls below a predefined threshold, so as to keep the programmable computation modules temporarily supplied by the electrical energy storage unit.

5. The monitoring unit according to claim 4, further comprising a reset button, configured to generate a reset signal to be sent to at least one of the programmable computation modules when it is activated, the electrical power supply management system being configured to automatically disconnect the common power supply rail from an internal power supply rail and to discharge the electrical energy storage unit when the reset button is activated.

6. A monitoring unit for monitoring a circuit breaker, the monitoring unit to be associated with the circuit breaker and to be connected electrically to input terminals of the circuit breaker, the monitoring unit comprising:
   a safety module including an integrated circuit configured to send a command for switching the circuit breaker when the safety module detects an operating anomaly;
   a plurality of programmable computation modules to provide functions for management of the circuit breaker when the monitoring unit is associated with the circuit breaker; and
   an electrical power supply management system comprising a connection interface to be connected to distinct electrical power supply sources, for receiving incoming electrical power delivered by the electrical power supply sources, the connection interface being electrically connected to the safety module and to the programmable computation modules for selective redistribution of the received electrical power towards the safety module and the programmable computation modules,
   wherein the electrical power supply management system is configured to switch automatically, according to a level of electrical power received from the electrical power supply sources and according to a predefined power supply program, between:
      at least one active power supply mode, in which the safety module and at least a portion of the programmable computation modules are electrically supplied with the incoming electrical power, and
      a safety power supply mode, in which the safety module is supplied with the incoming electrical power from the electrical power supply sources, and the programmable computation modules are isolated from the connection interface and are not supplied with the incoming electrical power, and
   wherein the electrical power supply management system comprises:
      voltage detection units, each to be associated with an electrical power supply source and being configured to send an activation signal when a corresponding voltage detection unit detects that the corresponding power supply source is generating a voltage greater than or equal to a predetermined voltage, and
      logic gates arranged to initiate switching between the safety power supply mode and at least one active power supply mode according to the signals sent by the voltage detection units.

7. The monitoring unit according to claim 1, wherein the electrical power supply management system is further configured to switch automatically from the safety power supply mode to an active power supply mode when the electrical power received on the connection interface rises above the predefined minimum threshold.

8. The monitoring unit according to claim 1, wherein each of the programmable computation modules comprises a programmable microprocessor or microcontroller.

9. An electrical circuit breaker, comprising:
the monitoring unit according to claim 1; and
at least a second electrical power supply source connected to the connection interface and being connected to input terminals of the electrical circuit breaker so as to be supplied with electricity by current flowing in the electrical circuit breaker during operation of the electrical circuit breaker.

* * * * *